United States Patent
Subramanian et al.

(10) Patent No.: US 10,769,024 B2
(45) Date of Patent: Sep. 8, 2020

(54) INCREMENTAL TRANSFER WITH UNUSED DATA BLOCK RECLAMATION

(71) Applicant: NetApp Inc., Sunnyvale, CA (US)

(72) Inventors: Ananthan Subramanian, San Ramon, CA (US); Rimas Svarcas, Sunnyvale, CA (US); Ram Kesavan, San Francisco, CA (US); Srishylam Simharajan, Cranberry Township, PA (US); John Frederick Destefano, Newark, CA (US)

(73) Assignee: NetApp Inc., Sunnyvale, CA (US)

( * ) Notice: Subject to any disclaimer, the term of this patent is extended or adjusted under 35 U.S.C. 154(b) by 1009 days.

(21) Appl. No.: 14/861,310

(22) Filed: Sep. 22, 2015

(65) Prior Publication Data

US 2017/0031772 A1  Feb. 2, 2017

Related U.S. Application Data

(60) Provisional application No. 62/199,712, filed on Jul. 31, 2015.

(51) Int. Cl.
*G06F 11/14* (2006.01)
*G06F 3/06* (2006.01)
*G06F 16/11* (2019.01)

(52) U.S. Cl.
CPC .......... *G06F 11/1451* (2013.01); *G06F 3/064* (2013.01); *G06F 3/067* (2013.01); *G06F 3/0608* (2013.01); *G06F 16/128* (2019.01); *G06F 2201/80* (2013.01); *G06F 2201/84* (2013.01)

(58) Field of Classification Search
CPC .... G06F 11/1451; G06F 3/0608; G06F 3/064; G06F 3/067; G06F 17/30088; G06F 2201/80; G06F 2201/84
See application file for complete search history.

(56) References Cited

U.S. PATENT DOCUMENTS

| | | | | |
|---|---|---|---|---|
| 7,454,445 | B2 * | 11/2008 | Lewis | G06F 11/14 |
| 7,617,217 | B1 * | 11/2009 | Chen | G06F 11/1435 |
| 8,086,652 | B1 * | 12/2011 | Bisson | G06F 3/0608 707/823 |
| 8,364,644 | B1 * | 1/2013 | Yadav | G06F 17/30088 707/649 |
| 8,671,072 | B1 * | 3/2014 | Shah | G06F 3/0619 707/610 |
| 9,195,670 | B1 * | 11/2015 | Mam | G06F 11/1451 |
| 9,335,931 | B2 * | 5/2016 | Patterson | G06F 3/061 |

(Continued)

*Primary Examiner* — Amresh Singh
(74) *Attorney, Agent, or Firm* — Cooper Legal Group, LLC (57) ABSTRACT

One or more techniques and/or systems are provided for incremental transfer with unused data block reclamation. For example, source volume of a source storage filer may have a physical replication relationship with a destination volume of a destination storage filer. Snapshots of a file system of the source volume may be used to identify new data blocks (e.g., data blocks allocated or reallocated to a new snapshot) and/or unused data blocks (e.g., data blocks of a deleted snapshot) used to incrementally update the destination volume so that the destination volume is a mirrored replication of the source volume. In this way, new data blocks may be updated and unused data blocks may be punched out (e.g., deallocated) of the destination volume during execution of an incremental update.

20 Claims, 8 Drawing Sheets

(56) References Cited

U.S. PATENT DOCUMENTS

| | | | |
|---|---|---|---|
| 9,558,072 B1* | 1/2017 | Mam | G06F 11/1451 |
| 2002/0083037 A1* | 6/2002 | Lewis | G06F 11/14 |
| 2005/0240637 A1* | 10/2005 | Kawamura | G06F 11/1461 |
| 2007/0083722 A1* | 4/2007 | Per | G06F 11/1451 |
| | | | 711/162 |
| 2016/0147607 A1* | 5/2016 | Dornemann | G06F 11/1435 |
| | | | 711/162 |

* cited by examiner

United States Patent US 10,769,024 B2

INCREMENTAL TRANSFER WITH UNUSED DATA BLOCK RECLAMATION

RELATED APPLICATION

This application is a non-provisional filing of and claims priority to U.S. Provisional Application No. 62/199,712, titled "INCREMENTAL TRANSFER WITH UNUSED DATA BLOCK RECLAMATION" and filed on Jul. 31, 2015, which is incorporated herein by reference.

BACKGROUND

A storage network environment may provide clients with access to user data stored across one or more storage devices. For example, the storage network environment may comprise one or more storage filers (e.g., storage controllers, nodes, etc.) configured to provide clients with access to user data stored within storage devices. A first storage filer may store user data within a first volume hosted by the first storage filer. The user data may be accessible through a file system associated with the first volume. The user data may be replicated into a second volume hosted by a second storage filer. Thus, if the first storage filer fails, then the second storage filer may provide clients with access to the replicated user data within the second volume. Physical replication may be used to replicate data blocks from the first volume to the second volume. For example, a baseline transfer may be performed to replicate the data blocks from the first volume to the second volume. Thereafter, incremental transfers may be performed to replicate changes to data blocks from the first volume to the second volume, as opposed to replicating the entire set of data blocks of the first volume. In this way, incremental transfers may improve the efficiency of replication and reduce network bandwidth utilization. Physical replication may utilize snapshots corresponding to point in time representations of the content of files and directories within the file system of the first volume. For example, a snapshot of the file system of the first volume may be compared to a subsequent snapshot of the file system of the first volume for identifying user data that has changed since a point in time at which the snapshot was captured and a subsequent point in time at which the subsequent snapshot was captured.

An active map may be maintained for the file system. The active map may represent the vacancy of data blocks for the file system. Snapshot data block ownership may be recorded by updating entries within an active map of a snapshot. The active map may comprise a bitmap where a first value, such as "0", indicates that a corresponding data block is not being used by the snapshot (e.g., a block number of the data block is not allocated to the snapshot) and a second value, such as "1", indicates that the data block is being used by the snapshot (e.g., the block number is allocated to the snapshot). In this way, snapshots may have active maps that indicate which data blocks are allocated to such snapshots. A summary map is used to describe allocated data blocks and available data blocks of an entire volume based upon snapshots of the volume. For example, the summary map may comprise a logical OR bitmap corresponding to a logical OR operation of active maps of snapshots. The summary map may be used to identify data blocks that are in use by snapshots so as to mitigate overwriting such data blocks.

As snapshots are deleted at the first storage filer, data blocks may become unused until subsequently used for other data such as a subsequent snapshot. It may be advantageous to reclaim corresponding unused data blocks at the second storage filer. Accordingly, a block reclamation scanner may walk the entire file system of the second storage filer to identify unused data blocks. The block reclamation scanner may be used after an incremental transfer of new data blocks. Performing an additional separate traversal of the file system of the second storage filer may waste time and/or computing resources that may otherwise be used for other purposes such as providing clients with access to user data.

DETAILED DESCRIPTION

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more systems and/or techniques for incremental transfer with unused data block reclamation are provided. For example, active maps and/or summary maps associated with snapshots of a source volume (e.g., snapshots of a source file system associated with the source volume) may be evaluated to identify a set of new data blocks (e.g., data blocks of the source volume that are not yet replicated to a destination volume, such as data blocks recently allocated to a new snapshot of the source volume) and a set of unused data blocks of the source volume (e.g., data blocked previously allocated to a snapshot that has been deleted). A new incremental transfer may be implemented. The new incremental transfer may comprise an instruction for a destination storage filer hosting the destination volume to punch out the set of unused data blocks (e.g., data blocks of the destination volume may be deallocated or set to being available as opposed to storing stale data) during execution of the new incremental transfer for writing the set of new data blocks to the destination volume. Punching out unused data blocks while performing the new incremental transfer (e.g., concurrently writing new data blocks and punching out unused data blocks during a single walk through of a destination file system of the destination volume) will reduce processing resources and/or time otherwise used to perform a second subsequent scan to identify and remove unused data blocks after execution of the new incremental transfer to write the new data blocks. Punching out unused data blocks at the destination volume will increase storage efficiency of the destination volume because the unused data blocks will now become available for data storage as opposed to storing stale replicated data (e.g., replicated data of the deleted snapshot of the source volume)

Figure 1:
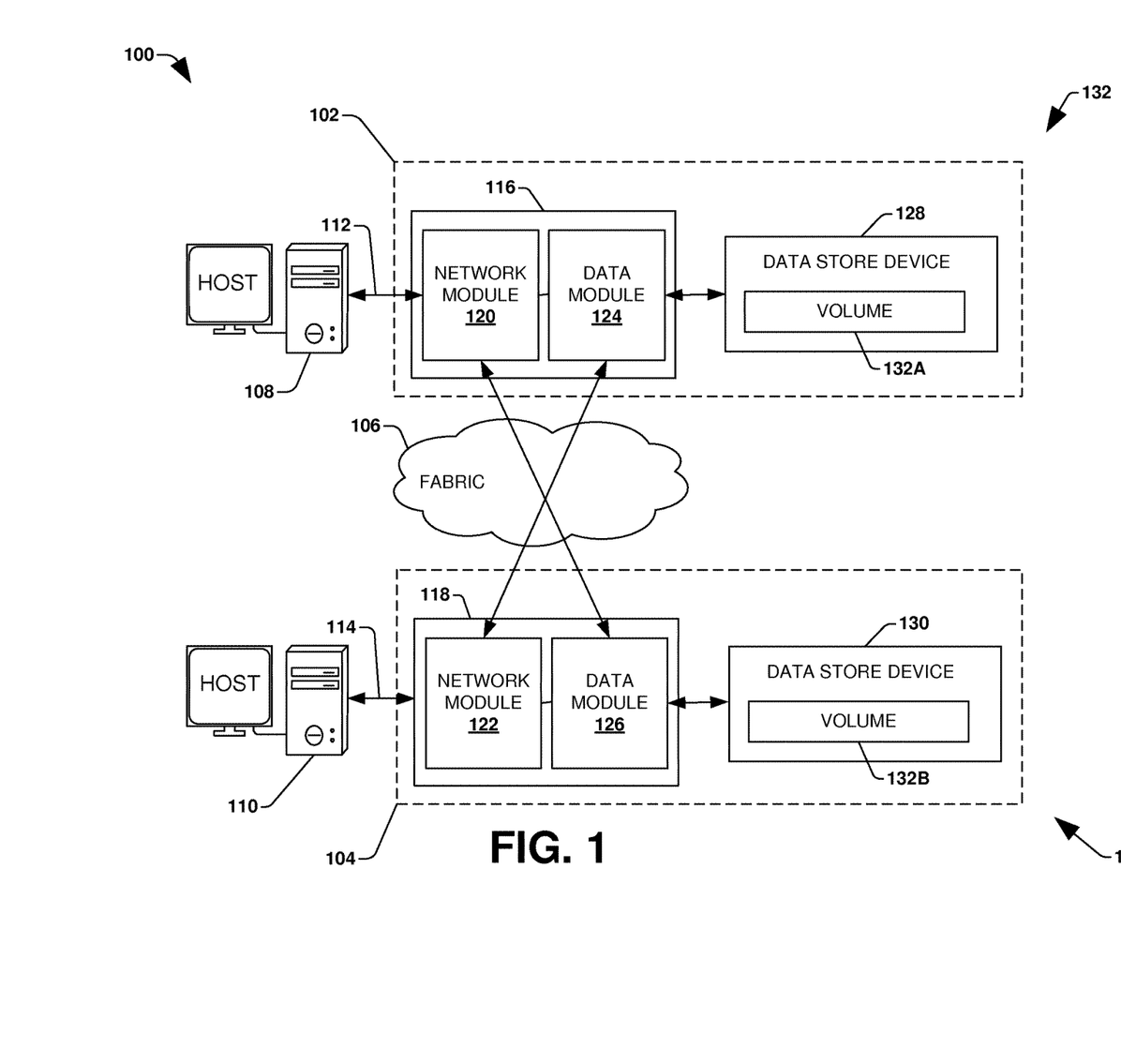
FIG. 1 is a component block diagram illustrating an example clustered network in accordance with one or more of the provisions set forth herein.

To provide context for incremental transfer with unused data block reclamation, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems or storage sites 102 and 104 that are coupled over a cluster fabric 106, such as a computing network embodied as a private Infiniband, Fibre Channel (FC), or Ethernet network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, or storage area network (SAN) protocols, such as internet Small Computer System Interface (iSCSI) or Fiber Channel (FC). Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the exemplary environment 100, nodes 116, 118 can comprise various functional components that coordinate to provide distributed storage architecture for the cluster. For example, the nodes can comprise a network module 120, 122 and a data module 124, 126. Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that incremental transfer with unused data block reclamation, such as for physical replication between virtual volumes, may be implemented within the clustered network environment 100. For example, unused data blocks within the volume 132A may be identified by the node 102. During an incremental transfer of new data blocks from the volume 132A to the volume 132B for physical replication, an instruction may be provided to the node 118 for the node 118 to punch out corresponding unused data blocks within the volume 132B concurrently and/or inline during execution of the incremental transfer. It may be appreciated that incremental transfer with unused data block reclamation may be implemented for and/or between any type of computing environment, and may be transferrable between physical devices (e.g., node 116, node 118, etc.) and/or a cloud computing environment (e.g., remote to the clustered network environment 100).

Figure 2:
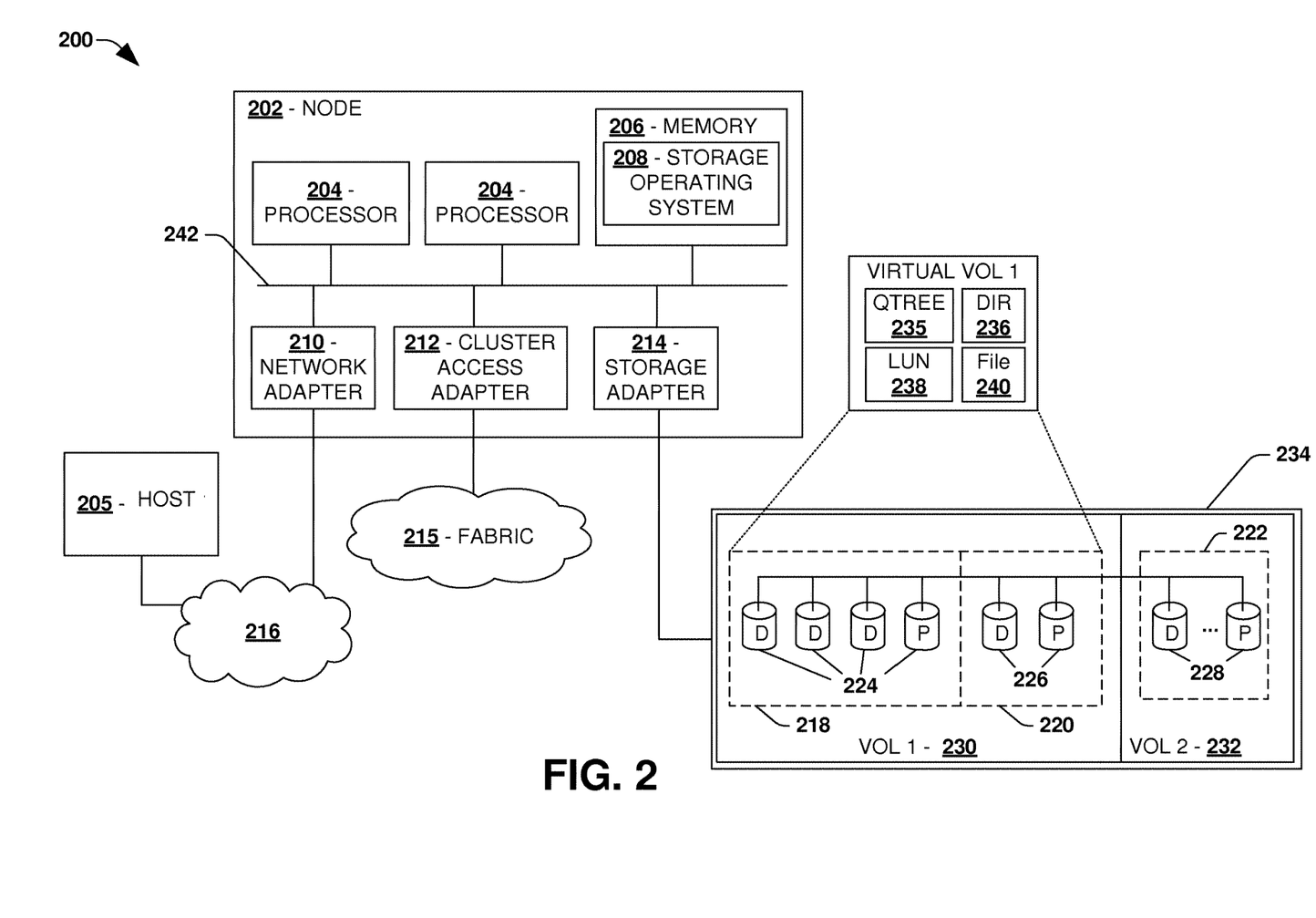
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards. As provided herein, incremental transfer with unused data block reclamation may be implemented for physical replication between virtual volumes.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that incremental transfer with unused data block reclamation may be implemented, such as for physical replication between virtual volumes, for the data storage system 200. For example, unused data blocks of volume 230 may be identified by the node 202. During an incremental transfer of new data blocks from the volume 230 to a second volume hosted by a second node for physical replication, an instruction may be provided to the second node for the second node to punch out the unused data blocks concurrently and/or inline during execution of the incremental transfer. It may be appreciated that incremental transfer with unused data block reclamation may be implemented for and/or between any type of computing environment, and may be transferrable between physical devices (e.g., node 202, host 205, etc.) and/or a cloud computing environment (e.g., remote to the node 202 and/or the host 205).

Figure 3:
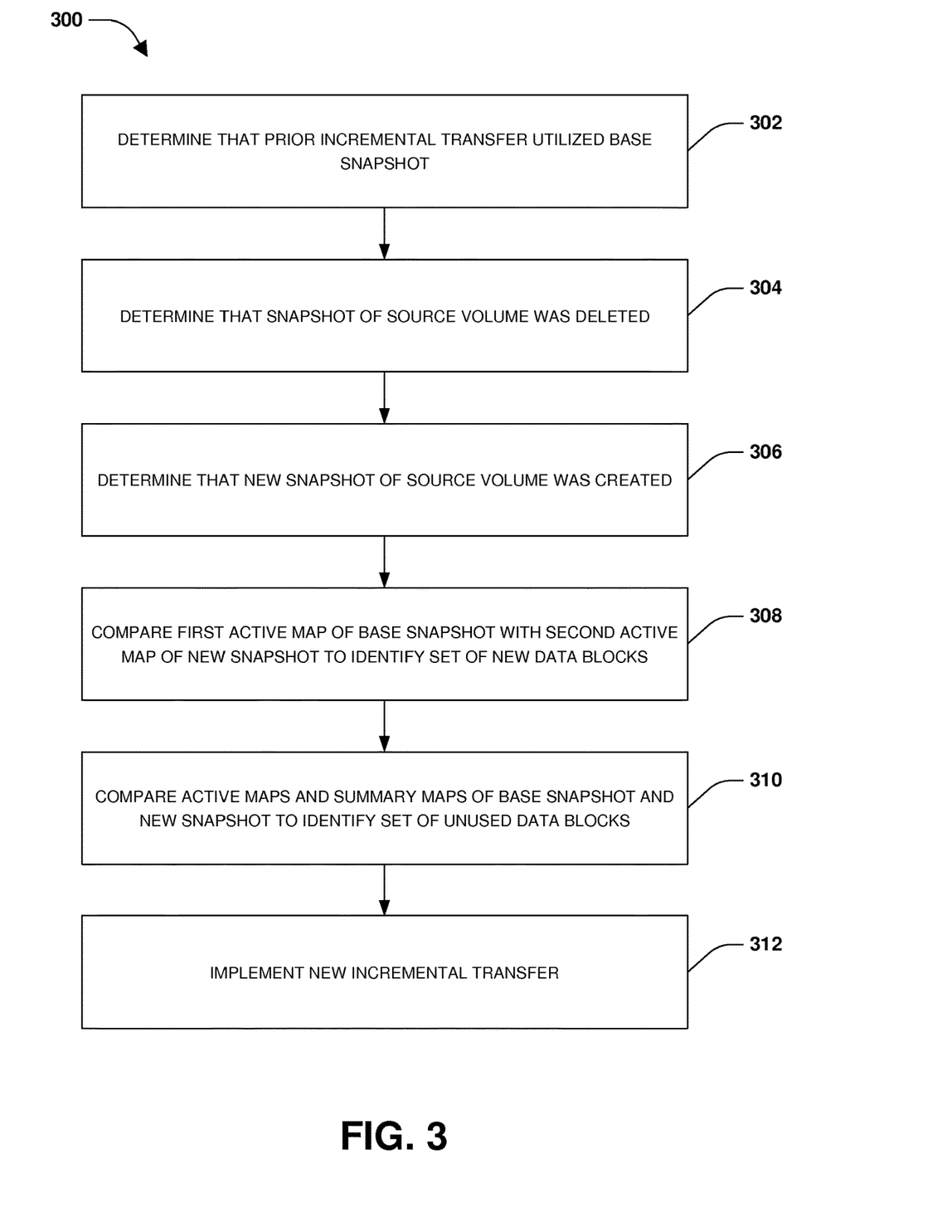
FIG. 3 is a flow chart illustrating an exemplary method of incremental transfer with unused data block reclamation.

One embodiment of incremental transfer with unused data block reclamation, such as for physical replication between virtual volumes, is illustrated by an exemplary method 300 of FIG. 3. A source storage filer (e.g., a storage server) may host a source file system associated with a source volume (e.g., a flexible volume) having a physical replication relationship with a destination volume associated with a destination file system hosted by a destination storage filer. A baseline transfer may be used to replicate source data blocks of the source volume to destination data blocks of the destination volume, resulting in the destination volume comprising mirrored data matching data of the source volume. Incremental transfers of new data blocks may be performed from the source volume to the destination volume so that the destination volume is kept up-to-date with mirrored data corresponding to data of the source volume. It may be appreciated that in an example, a new data block refers to a data block having a changed state, such as where an allocation of the data block has changed (e.g., a previously unallocated or unused data block that is now allocated to store data of a snapshot; a data block previously allocated to a first snapshot but is now allocated to a second snapshot; etc.).

At 302, a prior incremental transfer may be determined, such as by the storage server (e.g., the source storage filer), as having utilized a base snapshot of the source file system of the source volume at the source storage filer for physical replication of data blocks to the destination volume of the destination storage filer. For example, a first snapshot, a second snapshot, and a third snapshot of the source file system may have been created. The prior incremental transfer may have used the third snapshot as the base snapshot for determining what new data blocks to replicate to the destination volume. At 304, a snapshot of the source volume, such as the first snapshot, may be determined as having been deleted after the prior incremental transfer.

A determination may be made that a new incremental transfer, from the source volume to the destination volume, is to be performed subsequent the prior incremental transfer. Accordingly, at 306, a new snapshot of source file system of the source volume (e.g., a current point in time representation of the source file system) may be determined as being created subsequent the prior incremental transfer. For example, a fourth snapshot may have been created after the prior incremental transfer.

An active map may represent vacancy of data blocks of the source file system. In an example, a first active map of the base snapshot may comprise a bitmap specifying whether data blocks of the source volume were used by (e.g., allocated to) the base snapshot when the base snapshot was captured. A second active map of the new snapshot may comprise a bitmap specifying whether data blocks of the source volume were used by (e.g., allocated to) the new snapshot when the new snapshot was captured. A first summary map may comprise a logical OR bitmap of active maps of snapshots of the source volume when the base snapshot was created. A second summary map may comprise a logical OR bitmap of active maps of snapshots of the source volume when the new snapshot was created.

Active maps and/or summary maps may be evaluated to identify new data blocks (e.g., a data block that has been newly allocated to a snapshot) and/or unused data blocks (e.g., a data block previously allocated to a deleted snapshot). At 308, the first active map of the base snapshot may be compared with the second active map of the new snapshot to identify a set of new data blocks, allocated to the new snapshot, to transfer to the destination volume using the new incremental transfer.

At 310, the first active map and/or the first summary map of the base snapshot may be compared with the second active map and/or the second summary map of the new snapshot to identify a set of unused data blocks previously allocated to the snapshot that was deleted from the source volume. Referring to example 400 of FIG. 4, a set of data evaluation rules 402 may be used to compare the active maps and summary maps of the base snapshot and the new snapshot to identify the set of unused data blocks.

Figure 4:
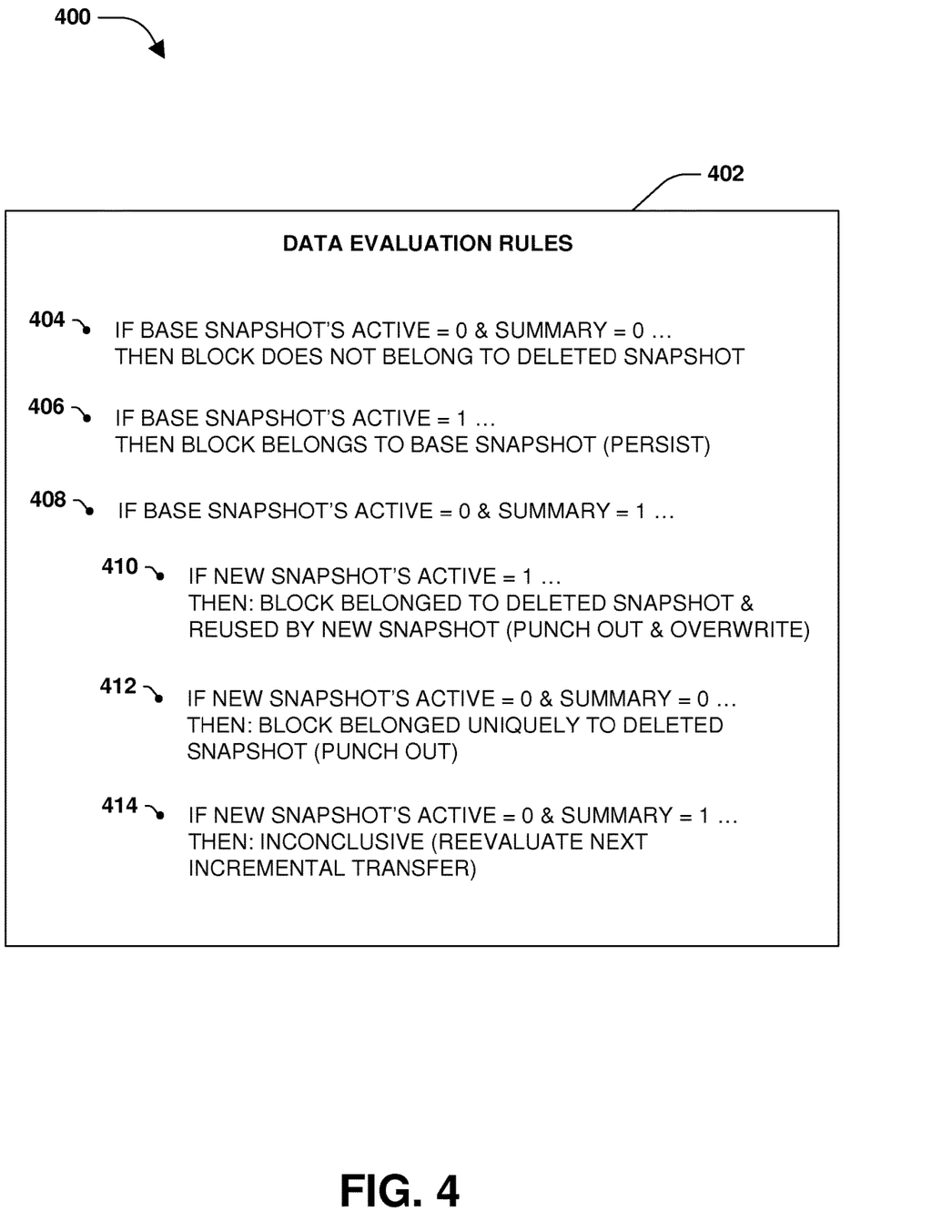
FIG. 4 is an illustration of an example of data evaluation rules for identifying unused data blocks.

A first data evaluation rule 404 may specify that if the first active map of the base snapshot indicates that a data block was not allocated to the base snapshot when the base snapshot was captured (e.g., represented by "0") and the first summary map indicates that the data block was not allocated to at least one snapshot of the source volume when the base snapshot was captured (e.g., represented by "0"), then the data block may be determined as not belonging to the snapshot that was deleted from the source volume. Thus, the data block is not identified as an unused data block that was previously allocated to the deleted snapshot.

A second data evaluation rule 406 may specify that if the first active map of the base snapshot indicates that the data block was allocated to the base snapshot when the base snapshot was captured (e.g., represented by "1"), then the data block may be determined as belonging to the base snapshot and did not uniquely belong to the snapshot that was deleted from the source volume. Thus, the data block is not identified as an unused data block that previously allocated to the deleted snapshot.

If a condition 408 where the first active map of the base snapshot indicates that a data block was not allocated to the base snapshot when the base snapshot was captured (e.g., represented by "0") and the first summary map indicates that the data block was allocated to at least one snapshot of the source volume when the base snapshot was captured (e.g., represented by "1"), then a third data evaluation rule 410, a fourth data evaluation rule 412, and/or a fifth data evaluation rule 414 may be used to evaluate active maps and/or summary maps for unused data block identification.

The third data evaluation rule 410 may specify that if the second active map of the new snapshot indicates that the data block was allocated to the new snapshot when the new snapshot was captured (e.g., represented by "1"), then the data block may be determined as previously being allocated to the snapshot that was deleted and is currently allocated to the new snapshot. Thus, the data block is identified as an unused data block that was previously allocated to the deleted snapshot, and a corresponding data block within the destination volume will be punched out by the destination storage filer and overwritten based upon the new snapshot (e.g., a new data block, of the new snapshot, may be transferred through the incremental transfer to overwrite the corresponding data block at the destination volume).

The fourth data evaluation rule 412 may specify that if the second active map of the new snapshot indicates that the data block was not allocated to the new snapshot when the new snapshot was captured (e.g., represented by "0") and the second summary map indicates that the data block was not allocated to at least one snapshot of the source volume when the new snapshot was captured (e.g., represented by "0"), then the data block may be determined as previously being (e.g., uniquely) allocated to the snapshot that was deleted. Thus, the data block is identified as an unused data block that was previously allocated to the deleted snapshot, and a corresponding data block within the destination volume will be punched out by the destination storage filer.

The fifth data evaluation rule 414 may specify that if the second active map of the new snapshot indicates that the data block was not allocated to the new snapshot when the new snapshot was captured (e.g., represented by "0") and the second summary map indicates that the data block was allocated to at least one snapshot of the source volume when the new snapshot was captured (e.g., represented by "1"), then further evaluation of the data block may be performed such as during a subsequent incremental transfer because the data block may or may not be unique to the snapshot that was deleted (e.g., the second summary map of the new snapshot may not be fully processed, and thus the data block may persist).

At 312, the new incremental transfer, comprising an instruction for the destination storage filer to punch out the set of unused data blocks from the destination volume and to write the set of new data blocks to the destination volume, may be implemented (e.g., transferred from the source storage filer to the destination storage filer for implementation). For example, the destination storage filer may be instructed to punch out (e.g., deallocate and set to an available state) the set of unused data blocks (e.g., corresponding destination volume data blocks within the destination volume, such as within a container file associated with the destination volume) concurrently and/or inline during execution of the new incremental transfer for writing the set of new data blocks. For example, during execution of the incremental transfer, the destination storage filer may evaluate a data block of the destination volume. If the data block corresponds to the set of unused data blocks, then the data block may be punched out (e.g., deallocated and set to an available state). If the data block corresponds to the set of new data blocks, then the data block may be written to based upon a corresponding data block within the set of new data blocks. In this way, new data blocks may be written to and/or unused data blocks may be punched out using a single traversal, as opposed to two separate traversals where a first traversal of the source volume would be performed for data transfer and a second traversal of the destination volume would be performed for block reclamation.

Figure 5A:
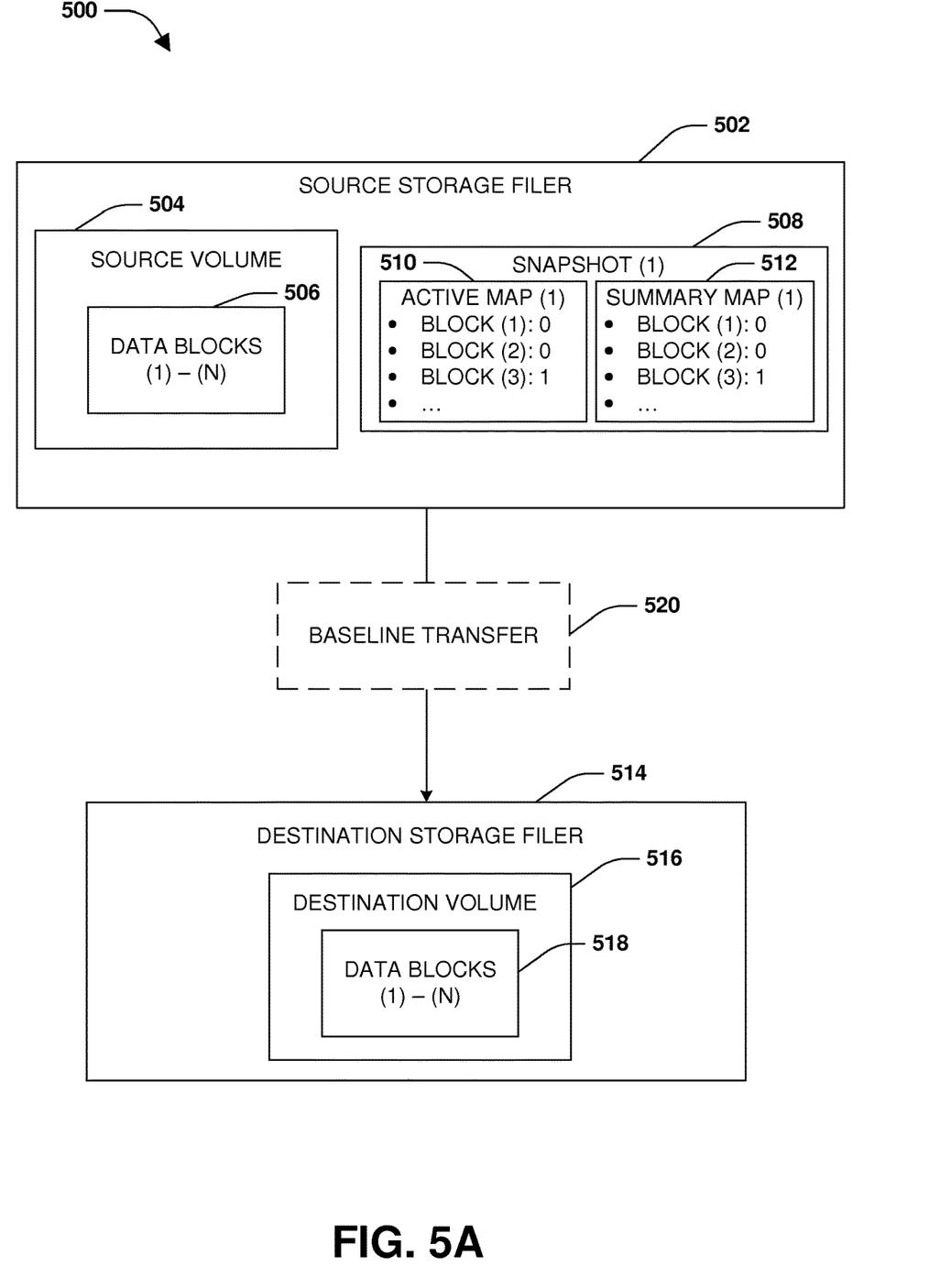
FIG. 5A is a component block diagram illustrating an exemplary system for incremental transfer with unused data block reclamation, where a baseline transfer is performed.
Figure 5B:
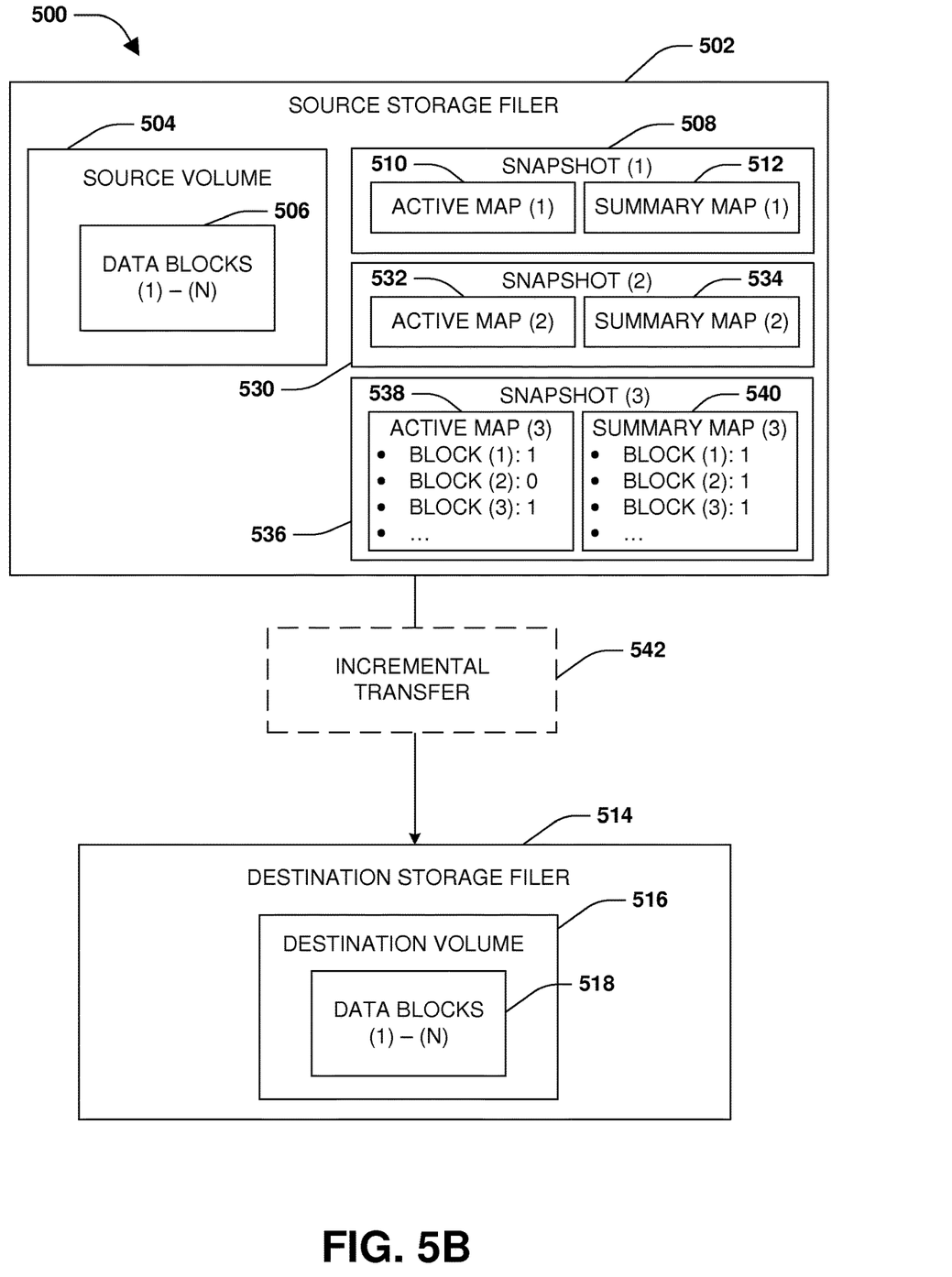
FIG. 5B is a component block diagram illustrating an exemplary system for incremental transfer with unused data block reclamation, where an incremental transfer is performed.
Figure 5C:
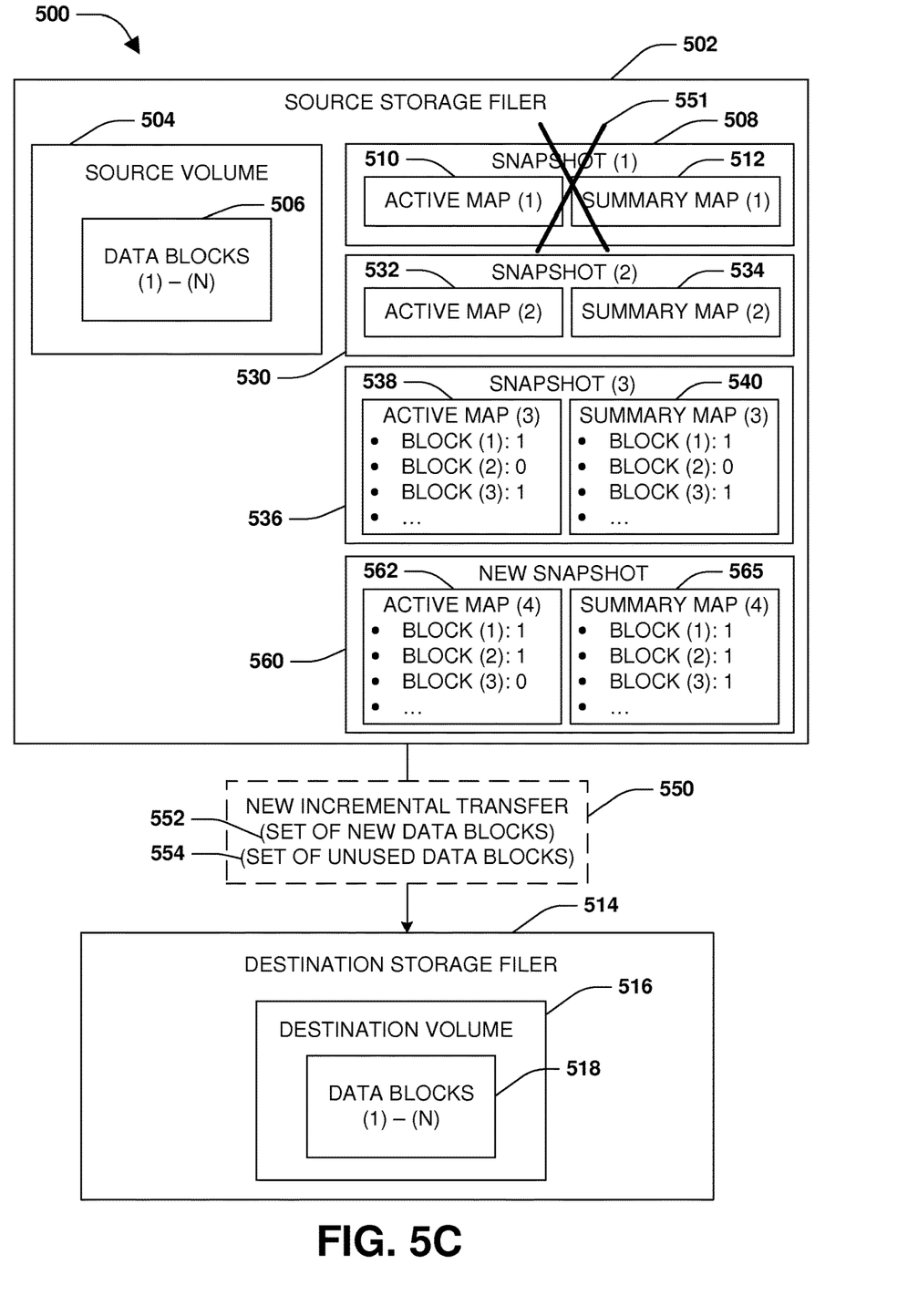
FIG. 5C is a component block diagram illustrating an exemplary system for incremental transfer with unused data block reclamation, where a new incremental transfer is performed for reclamation of unused data blocks.

FIGS. 5A-5C illustrate examples of a system 500 for incremental transfer with unused data block reclamation. The system 500 may comprise a computing device, such as a source storage filer 502, a destination storage filer 514, a storage server, or a remote computing device (e.g., hosted within a cloud of computing resources). The source storage filer 502 may host a source volume 504 associated with a source file system that stores data within source data blocks 506, as illustrated in FIG. 5A. Snapshots 508 of the source file system may be captured as point in time representations of the source file system. For example, a first snapshot 508 may be captured. The source snapshot 508 may comprise a first active map 510 comprising a bitmap specifying whether source data blocks were used by the first snapshot 508 when the first snapshot 508 was captured. The source snapshot 508 may comprise a first summary map 512 comprising a logical OR bitmap of actives maps, such as the first active map 510, of snapshots of the source file system when the first snapshot 508 was captured.

The source storage filer 502 may have a physical replication relationship with the destination storage filer 514. A baseline transfer 520 may be performed utilizing the first snapshot 508 to replicate the source data blocks 506 to destination data blocks 518 of a destination volume 516 hosted by the destination storage filer 514. In this way, the destination data blocks 518 may mirror the source data blocks 506.

FIG. 5B illustrates an incremental transfer 542 being performed. A second snapshot 530, comprising a second active map 532 (e.g., a bitmap specifying which source data blocks were used by the second snapshot 530 when the second snapshot 530 was captured) and a second summary map 534 (e.g., a logical OR bitmap of the first active map 510 and the second active map 532), may have been captured since the baseline transfer 520. A third snapshot 536, comprising a third active map 538 (e.g., a bitmap specifying which source data blocks were used by the third snapshot 536 when the third snapshot 536 was captured) and a third summary map 540 (e.g., a logical OR bitmap of the first active map 510, the second active map 532, and the third active map 538), may have been captured since the baseline transfer 520. The first active map 510 may be compared to the third active map 538 to identify a set of new data blocks (e.g., newly allocated source data blocks) for replication, using the incremental transfer 542, to the destination volume 516. In this way, the incremental transfer 542 may be used to update the destination data blocks 518 to mirror the source data blocks 506, such as at a point in time during which the third snapshot 536 was captured.

FIG. 5C illustrates a new incremental transfer 550 used to reclaim unused destination data blocks within the destination volume 516. A new snapshot 560, comprising a fourth active map 562 (e.g., a bitmap specifying which source data blocks were used by the new snapshot 560 when the new snapshot 560 was captured) and a fourth summary map 565 (e.g., a logical OR bitmap of the first active map 510, the second active map 532, the third active map 538, and/or the fourth active map 562), may have been captured since the incremental transfer 542. The first snapshot 508 may have been deleted 551 since the incremental transfer 542.

A set of new data blocks 552 may be identified, for inclusion within the new incremental transfer 550, based upon a comparison of the fourth active map 562 of the new snapshot 560 and the third active map 538 of the third snapshot 536 (e.g., the third snapshot 536 may be determined to be a baseline snapshot of the incremental transfer 542 because the third snapshot 536 was the latest snapshot used to identify new data blocks for transfer through the incremental transfer 542). A set of unused data blocks 554 (e.g., unallocated source data blocks), for inclusion within the new incremental transfer 550, may be determined based upon an evaluation of the third active map 538 of the third snapshot 536, the third summary map 540 of the third snapshot 536, the fourth active map 562 of the new snapshot 560, and/or the fourth summary map 565 of the new snapshot 560 using the data evaluation rules 402 of FIG. 4. In this way, the new incremental transfer 550, comprising an instruction for the destination storage filer 514 to punch out the set of unused data blocks 554 (e.g., corresponding destination data blocks) from the destination volume 516 and to write the set of new data blocks 552 to the destination volume 516 (e.g., allocate destination data blocks based upon the new snapshot 560), may be sent to the destination storage filer 514. The destination storage file 514 may write the set of new data blocks 552 and punch out the set of unused data blocks 554 while executing the new incremental transfer 550 (e.g., based upon a single traversal).

Figure 6:
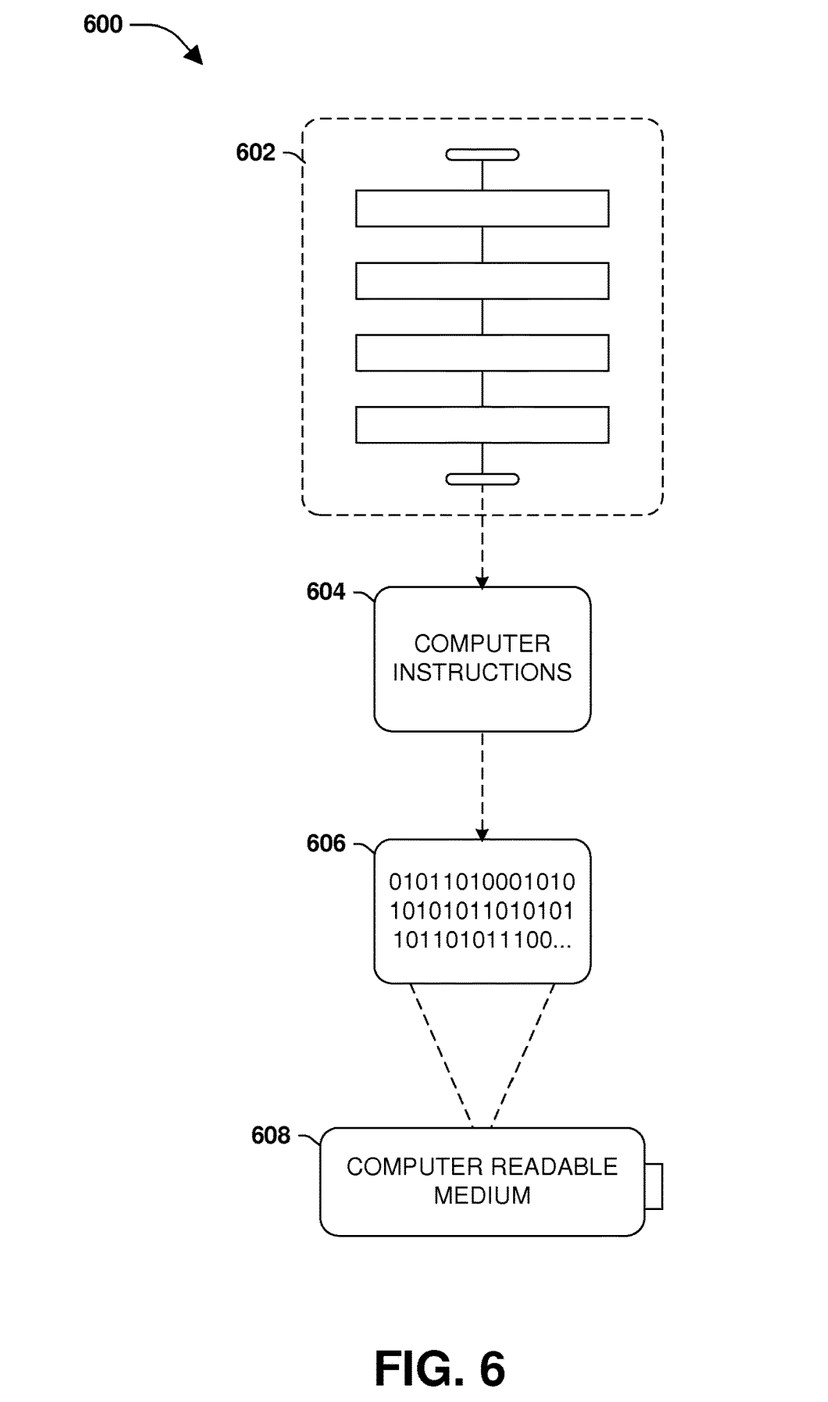
FIG. 6 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 6, wherein the implementation 600 comprises a computer-readable medium 608, such as a CD-R, DVD-R, flash drive, a platter of a hard disk drive, etc., on which is encoded computer-readable data 606. This computer-readable data 606, such as binary data comprising at least one of a zero or a one, in turn comprises a set of computer instructions 604 configured to operate according to one or more of the principles set forth herein. In some embodiments, the processor-executable computer instructions 604 are configured to perform a method 602, such as at least some of the exemplary method 300 of FIG. 3, for example. In some embodiments, the processor-executable instructions 604 are configured to implement a system, such as at least some of the exemplary system 500 of FIGS. 5A-5C, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   determining that a transfer utilized a base snapshot of a source volume hosted by a first node for replication of blocks to a destination volume hosted by a second node, where a snapshot of the source volume is deleted after the transfer and a new snapshot of the source volume is created subsequent the transfer;
   identifying a set of new blocks, allocated to the new snapshot, to transfer to the destination volume by a subsequent transfer based upon a comparison of a first active map of the base snapshot and a second active map of the new snapshot;
   identifying a set of unused blocks, previously allocated to the snapshot, deleted from the source volume based upon a comparison of the first active map and a first summary map of the base snapshot with the second active map and a second summary map of the new snapshot, wherein the identifying comprises:
      including a block within the set of unused blocks based upon the active and summary maps indicating that the block was unallocated to the base snapshot and unallocated to at least one snapshot of the source volume when the base snapshot was captured, and indicating that the block was unallocated to the new snapshot and unallocated to at least one snapshot of the source volume when the new snapshot was captured; and
   performing the subsequent transfer to transmit the set of new blocks to the second node to write to the destination volume, wherein the subsequent transfer instructs the second node to deallocate the set of unused blocks from the destination volume during execution of the subsequent transfer to write the set of new blocks to the destination volume.

2. The method of claim 1, comprising:
   removing the set of unused blocks concurrently during execution of the subsequent transfer for writing the set of new blocks.

3. The method of claim 1, comprising:
   determining that a first block was unallocated to the snapshot deleted from the source volume based the first active map indicated that the first block was unallocated to the base snapshot when the base snapshot was captured and the first summary map indicating that the first block was unallocated to at least one snapshot of the source volume when the base snapshot was captured.

4. The method of claim 1, comprising:
   determining that a first block belonged to the base snapshot and was unallocated to the snapshot that was deleted from the source volume based upon the first active map indicating that the first block was allocated to the base snapshot when the base snapshot was captured.

5. The method of claim 1, comprising:
   determining that a first block was previously allocated to the snapshot and is currently allocated to the new snapshot based upon the first active map indicating that the first block was unallocated to the base snapshot when the base snapshot was captured, the first summary map indicating that the first block was allocated to at least one snapshot of the source volume when the base snapshot was captured, and the second active map indicating that the first block was allocated to the new snapshot when the new snapshot was captured.

6. The method of claim 1, comprising:
   determining that a first block was previously allocated to the snapshot and is now an unused block for inclusion within the set of unused blocks based upon the first active map indicating that the first block was unallocated to the base snapshot when the base snapshot was captured, the first summary map indicating that the first block was allocated to at least one snapshot of the source volume when the base snapshot was captured, the second active map indicating that the first block was unallocated to the new snapshot when the new snapshot was captured, and the second summary map indicating that the first block was unallocated to at least one snapshot of the source volume when the new snapshot was captured.

7. The method of claim 1, comprising:
   determining that a first block is to be further evaluated for determination as to whether the first block is an unused data block during a subsequent incremental transfer based upon the first active map indicating that the first block was unallocated to the base snapshot when the base snapshot was captured, the first summary map indicating that the first block was allocated to at least one snapshot of the source volume when the base snapshot was captured, the second active map indicating that the first block was unallocated to the new snapshot when the new snapshot was captured, and the second summary map indicating that the first block was allocated to at least one snapshot of the source volume when the new snapshot was captured.

8. The method of claim 1, wherein the first active map comprises a bitmap specifying whether blocks of the source volume were used by the base snapshot when the base snapshot was captured.

9. The method of claim 1, wherein the second active map comprises a bitmap specifying whether blocks of the source volume were used by the new snapshot when the new snapshot was captured.

10. The method of claim 1, wherein the first summary map comprises a logical OR bitmap of active maps of snapshots of the source volume when the base snapshot was captured.

11. The method of claim 1, wherein the second summary map comprises a logical OR bitmap of active maps of snapshots of the source volume when the new snapshot was captured.

12. A non-transitory machine readable medium having stored thereon machine executable code which when executed by a machine, causes the machine to:

determine that a transfer utilized a base snapshot of a source volume hosted by a first node for replication of blocks to a destination volume hosted by a second node, where a snapshot of the source volume is deleted after the transfer and a new snapshot of the source volume is created subsequent the transfer;

identify a set of new blocks, allocated to the new snapshot, to transfer to the destination volume by a subsequent transfer based upon a comparison of a first active map of the base snapshot and a second active map of the new snapshot;

identify a set of unused blocks, previously allocated to the snapshot, deleted from the source volume based upon a comparison of the first active map and a first summary map of the base snapshot with the second active map and a second summary map of the new snapshot, comprising:

excluding a block from the set of unused blocks based upon the active and summary maps indicating that the block was unallocated to the base snapshot and allocated to at least one snapshot of the source volume when the base snapshot was captured, and indicating that the block was allocated to the new snapshot when the new snapshot was captured; and perform the subsequent transfer to transmit the set of new blocks to the second node to write to the destination volume, wherein the subsequent transfer instructs the second node to deallocate the set of unused blocks from the destination volume during execution of the subsequent transfer to write the set of new blocks to the destination volume.

13. The non-transitory machine readable medium of claim 12, wherein the machine executable code causes the machine to:

remove the set of unused blocks concurrently during execution of the subsequent transfer for writing the set of new blocks.

14. A computing device comprising:

a memory comprising machine executable code; and a processor coupled to the memory, the processor configured to execute the machine executable code to cause the processor to:

determine that a transfer utilized a base snapshot of a source volume hosted by a first node for replication of blocks to a destination volume hosted by a second node, where a snapshot of the source volume is deleted after the transfer and a new snapshot of the source volume is created subsequent the transfer;

identify a set of new blocks, allocated to the new snapshot, to transfer to the destination volume by a subsequent transfer based upon a comparison of a first active map of the base snapshot and a second active map of the new snapshot;

identify a set of unused blocks, previously allocated to the snapshot, deleted from the source volume based upon a comparison of the first active map and a first summary map of the base snapshot with the second active map and a second summary map of the new snapshot, comprising:

identifying a block for further evaluation during a subsequent incremental transfer based upon the active and summary maps indicating that the block was unallocated to the base snapshot and allocated to at least one snapshot of the source volume when the base snapshot was captured, and indicating that the block was unallocated to the new snapshot and allocated to at least one snapshot of the source volume when the new snapshot was captured; and perform the subsequent transfer to transmit the set of new blocks to the second node to write to the destination volume, wherein the subsequent transfer instructs the second node to deallocate the set of unused blocks from the destination volume during execution of the subsequent transfer to write the set of new blocks to the destination volume.

15. The computing device of claim 14, wherein the machine executable code causes the processor to:

determine that a first block was unallocated to the snapshot deleted from the source volume based the first active map indicated that the first block was unallocated to the base snapshot when the base snapshot was captured and the first summary map indicating that the first block was unallocated to at least one snapshot of the source volume when the base snapshot was captured.

16. The computing device of claim 14, wherein the machine executable code causes the processor to:

determine that a first block belonged to the base snapshot and unallocated to the snapshot that was deleted from the source volume based upon the first active map indicating that the first block was allocated to the base snapshot when the base snapshot was captured.

17. The computing device of claim 14, wherein the machine executable code causes the processor to:

determine that a first block was previously allocated to the snapshot and is currently allocated to the new snapshot based upon the first active map indicating that the first block was unallocated to the base snapshot when the base snapshot was captured, the first summary map indicating that the first block was allocated to at least one snapshot of the source volume when the base snapshot was captured, and the second active map indicating that the first block was allocated to the new snapshot when the new snapshot was captured.

18. The computing device of claim 14, wherein the machine executable code causes the processor to:

determine that a first block was previously allocated to the snapshot and is now an unused block for inclusion within the set of unused blocks based upon the first active map indicating that the first block was unallocated to the base snapshot when the base snapshot was captured, the first summary map indicating that the first block was allocated to at least one snapshot of the source volume when the base snapshot was captured, the second active map indicating that the first block was unallocated to the new snapshot when the new snapshot was captured, and the second summary map indicating that the first block was unallocated to at least one snapshot of the source volume when the new snapshot was captured.

19. The computing device of claim 14, wherein the machine executable code causes the processor to:

determine that a first block is to be further evaluated for determination as to whether the first block is an unused block during a subsequent incremental transfer based upon the first active map indicating that the first block was unallocated to the base snapshot when the base snapshot was captured, the first summary map indicating that the first block was allocated to at least one snapshot of the source volume when the base snapshot was captured, the second active map indicating that the first block was unallocated to the new snapshot when the new snapshot was captured, and the second summary map indicating that the first block was allocated to at least one snapshot of the source volume when the new snapshot was captured.

20. The computing device of claim 14, wherein the machine executable code causes the processor to:
  remove the set of unused blocks concurrently during execution of the subsequent transfer for writing the set of new blocks.

\* \* \* \* \*